UNITED STATES PATENT OFFICE.

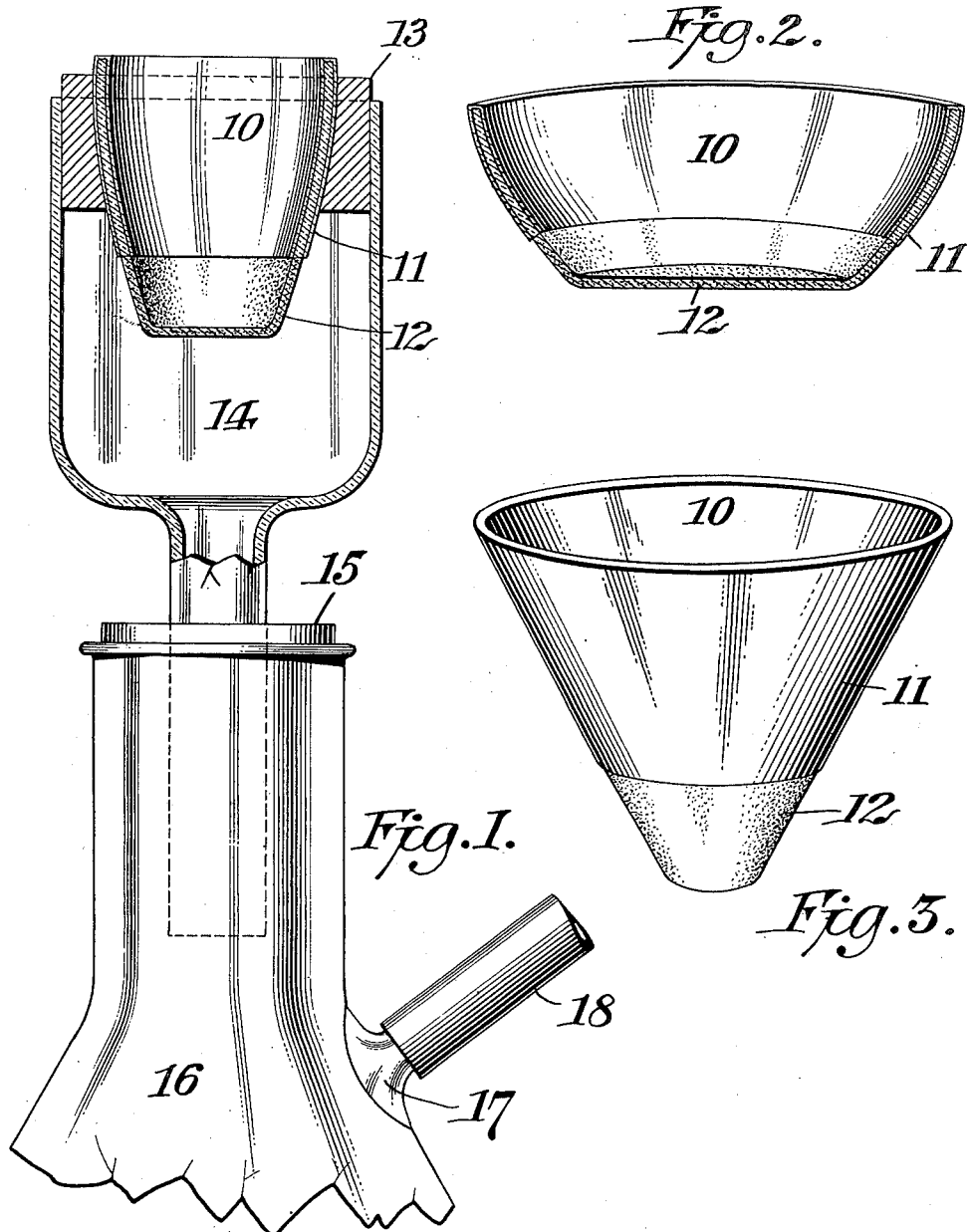

CHARLES P. GRIMWOOD, OF LOS ANGELES, CALIFORNIA.

LABORATORY FILTERING DEVICE.

1,316,789. Specification of Letters Patent. Patented Sept. 23, 1919.

Application filed November 4, 1918. Serial No. 260,931.

*To all whom it may concern:*

Be it known that I, CHARLES P. GRIMWOOD, a citizen of the United States, residing at Los Angeles, in the county of Los Angeles and State of California, have invented certain new and useful Improvements in Laboratory Filtering Devices, of which the following is a full, clear, and exact description.

This invention relates to chemical filtering apparatus for laboratory use, particularly filters of the porous earthenware or porcelain type. Two filtering devices of this type are now in common use. In one the cup is imperforate but unglazed, so that the liquid will pass through the pores of the material and the precipitated or undissolved solid particles be left behind. In this case the entire cup becomes saturated, so that a very appreciable percentage of the liquid does not pass through with the rest of the filtrate and the total weight of the filtrate or the solid is therefore not obtainable with the desired or necessary accuracy. In theory, the absorbed liquid can be expelled by forcing pure water through the pores, but practically it is difficult if not impossible to clean the entire cup in this way by reason of the excessive amount of water required or because the support (for example a rubber, cork, or carbon ring) makes the cup substantially impervious in the area where the two are in contact. Moreover, if the liquid to be filtered is a solution, as is often the case, more or less of the dissolved solid is often left in the pores when the liquid evaporates, thus impairing the filter if not making it wholly useless for subsequent work until the deposited matter has been entirely eliminated. In the other form referred to, the entire cup is glazed and is therefore non-porous, but its bottom is provided with small perforations. In use, a layer or pad of porous material, for example cotton or asbestos, is placed in the filter. In this case the finer solid particles are more apt to escape with the filtrate, and difficulty is experienced in expelling the absorbed liquid from the filtering pad when necessary. I have therefore been led to devise my present invention, which has for its object to provide a filtering cup or vessel which will not only be rapid and thoroughly effective but will also be convenient in use, the disadvantages heretofore encountered being eliminated or reduced to a minimum.

To this and other ends the invention consists in the novel features hereinafter described.

The preferred embodiments of the invention are illustrated in the annexed drawing, in which—

Figure 1 is a side view, partly in section, of a familiar arrangement of filtering apparatus, with my improved cup or vessel in use.

Fig. 2, in section, and Fig. 3, in perspective, illustrate other forms of the vessel.

My improved filtering cup 10 is made of porous earthenware, porcelain, "alundum", or other suitable porous and inert material, but its upper portion is thoroughly glazed, as indicated at 11, so as to be impervious. Its lower portion 12, however, is unglazed and is therefore finely porous so as to permit the passage of wash water or other liquid but retain the undissolved solids.

In use the vessel is supported in any convenient manner, as for example in a ring 13 which is seated in the top of a funnel 14, the ring making a substantially air-tight joint between the filtering vessel and the funnel. The stem of the funnel is fitted tightly in the air-tight stopper 15 of the flask 16, and the latter is provided with a nipple 17 for connection by means of a rubber tube 18 with a suitable suction apparatus, not shown, by which a partial vacuum can be maintained in the flask and funnel. The portion of the cup in contact with the support 13, is glazed, and hence any solid matter adhering to that part of the cup is readily and completely washed down without any of the wash water being absorbed by such portion, nor can any liquid in the cup be absorbed by such portion. On the contrary, absorption can occur only in the thin-walled and relatively small unglazed part 12. Hence the subsequent weighing is more accurate, and the filter can be more easily and more effectually cleaned for re-use. If the glaze penetrates clear through the wall of the cup, as indicated in the drawing, there can even be no absorption into the glazed area from below, but in general a surface glaze is sufficient.

The filtering cup shown in Fig. 1 is of the "crucible" type. In Fig. 2 it is in the form of a flat dish and in Fig. 3 conical. The latter is designed particularly for use with a conical funnel.

The nature of the glaze and the method of applying it are immaterial, except that the glaze should be inert to reagents that come in contact with it.

It is to be understood that the invention is not limited to the specific forms shown and described herein but can be embodied in other forms without departure from its spirit as defined by the following claims.

I claim:

1. A filtering vessel or cup made of porous earthenware or equivalent material, having its upper portion glazed and its bottom unglazed whereby the passage of liquid through the cup is confined to the unglazed part.

2. A filtering vessel or cup made of porous earthenware or equivalent material, the upper part of the cup being glazed to render it impervious from its edge downwardly for the major portion of its depth, but the lower portion, including the walls adjacent to the bottom, being unglazed and porous.

3. In a filtering apparatus the combination of a filtering vessel composed of ceramic material, the upper portion of which is glazed and therefore impervious to liquid, and the bottom of which and the lower end of the side walls of which are unglazed and therefore pervious, said vessel being at least in part located within a receptacle which is wider than the lower part of said filtering vessel, whereby a space is left between the lower and pervious part of said filtering vessel and the inner wall of said receptacle, and a packing ring forming an air-tight joint between some portion of the upper and impervious part of said vessel and said receptacle, said packing ring being in contact with the vessel, only upon glazed portions thereof.

4. A filtering crucible of ceramic material, a part only of which, located in the lower portion thereof, is composed of unglazed pervious material.

In testimony whereof I hereunto affix my signature.

CHARLES P. GRIMWOOD.